(12) United States Patent
Marino et al.

(10) Patent No.: US 12,153,705 B2
(45) Date of Patent: Nov. 26, 2024

(54) PLATFORM FOR UNSUPERVISED MACHINE LEARNING TRAINING ON UNSEEABLE USER GENERATED ASSETS

(71) Applicant: ADOBE INC., San Jose, CA (US)

(72) Inventors: William Marino, San Francisco, CA (US); Tim Converse, San Francisco, CA (US); Sudharshan reddy Kakumanu, Overland Park, KS (US); Shabnam Ghadar, Menlo Park, CA (US); Nico Becherer, Hamburg (DE); Dhaval Shah, Fremont, CA (US); Ben Bowles, Fremont, CA (US); Alvin Ghouas, San Francisco, CA (US); Alexander Riss, Hamburg (DE)

(73) Assignee: ADOBE INC., San Jose, CA (US)

( * ) Notice: Subject to any disclaimer, the term of this patent is extended or adjusted under 35 U.S.C. 154(b) by 354 days.

(21) Appl. No.: 17/217,024

(22) Filed: Mar. 30, 2021

(65) Prior Publication Data
US 2022/0318420 A1 Oct. 6, 2022

(51) Int. Cl.
*G06F 21/62* (2013.01)
*G06F 21/31* (2013.01)
*G06N 20/00* (2019.01)

(52) U.S. Cl.
CPC .......... *G06F 21/6245* (2013.01); *G06F 21/31* (2013.01); *G06N 20/00* (2019.01)

(58) Field of Classification Search
CPC ...... G06F 21/6245; G06F 21/31; G06N 20/00
See application file for complete search history.

(56) References Cited

U.S. PATENT DOCUMENTS

| | | | | |
|---|---|---|---|---|
| 10,121,021 B1* | 11/2018 | Fonseka | ................ | G06F 16/162 |
| 2008/0134297 A1* | 6/2008 | Clinick | ............ | G11B 20/00166 726/4 |
| 2017/0235957 A1* | 8/2017 | Maletsky | ............ | H04L 63/0807 713/168 |
| 2018/0024896 A1* | 1/2018 | Yamabiraki | ......... | G06F 11/2048 714/12 |
| 2018/0255023 A1* | 9/2018 | Whaley | ............... | H04L 63/0421 |
| 2019/0362083 A1* | 11/2019 | Ortiz | ..................... | H04L 9/3247 |
| 2020/0026649 A1* | 1/2020 | Lee | ..................... | G06F 11/1048 |
| 2020/0042630 A1* | 2/2020 | Yeaton | ................... | G06N 20/00 |
| 2020/0143267 A1* | 5/2020 | Gidney | ................. | H04L 9/3239 |
| 2020/0234121 A1* | 7/2020 | Stapleton | ................. | G06N 3/02 |
| 2020/0311300 A1* | 10/2020 | Callcut | ................... | G06F 30/20 |
| 2020/0349271 A1* | 11/2020 | Binkley | ................ | G06F 16/353 |
| 2020/0394327 A1* | 12/2020 | Childress | ............ | G06F 16/1824 |
| 2020/0394470 A1* | 12/2020 | Ganapavarapu | ....... | G06N 20/00 |
| 2021/0286863 A1* | 9/2021 | Jung | ....................... | G06F 3/167 |
| 2021/0326746 A1* | 10/2021 | Dayama | ................ | G06N 20/00 |
| 2022/0318420 A1* | 10/2022 | Marino | ................... | G06F 21/53 |
| 2023/0008976 A1* | 1/2023 | Xu | ........................ | H04L 9/3247 |

* cited by examiner

*Primary Examiner* — Shin-Hon (Eric) Chen
*Assistant Examiner* — Thomas A Carnes
(74) *Attorney, Agent, or Firm* — F. CHAU & ASSOCIATES, LLC (57) ABSTRACT

The present disclosure describes systems and methods for a privacy sensitive computing system. One or more embodiments provide a protected computing environment, a code authorization unit, and a data aggregation unit. For example, some embodiments of the privacy sensitive computing system may train unsupervised or self-supervised ML models on user-generated assets subject to privacy considerations that mandate those assets are not viewed directly by human eyes.

9 Claims, 7 Drawing Sheets

PLATFORM FOR UNSUPERVISED MACHINE LEARNING TRAINING ON UNSEEABLE USER GENERATED ASSETS

BACKGROUND

The following relates generally to machine learning, and more specifically to training a machine learning model with privacy sensitive data.

Machine learning refers to the development and use of computing algorithms that improve based on additional experiences or data. Therefore, obtaining training data is often a key part of the machine learning process. Once the data is obtained, it must often be filtered, modified, or manipulated.

However, in some cases, the data that would be useful for training a machine learning model is subject to privacy considerations. For example, some data is generated by users, or by systems that monitor user interactions. Privacy rules relating to the use of this data may prevent human users from viewing the data, which in turn may prevent them from using it for training machine learning models. Other privacy rules may effectively place a time limit on how long data can be stored or used to train machine learning models, adding a further constraint.

Therefore, there is a need in the art for systems and methods to enable the use of privacy sensitive data for training machine learning models.

SUMMARY

The present disclosure describes systems and methods for a privacy sensitive computing system. One or more embodiments provide a protected computing environment that uses a code authorization unit and a data aggregation unit to enable the use of privacy sensitive data for training a machine learning model. Before code is authorized for use in the protected computing environment, the code authorization unit verifies that the code does not violate privacy restrictions. A hash can be generated to assure that the code is not changed. The protected computing environment verifies the code based on the hash prior to allowing the code to interact with privacy sensitive data. The data aggregation unit aggregates the privacy sensitive data and allows limited access via the protected computing environment while enforcing privacy restrictions. For example, human users may be prevented from viewing data or access to the data can be limited in time.

A method, apparatus, non-transitory computer readable medium, and system for a privacy sensitive computing system are described. One or more embodiments of the method, apparatus, non-transitory computer readable medium, and system include authorizing code for use with privacy sensitive data, generating a hash of the code based on the authorization, establishing a protected computing environment for running the code on the privacy sensitive data, verifying the code within the protected computing environment based on the hash, and executing the code within the protected computing environment to process the privacy sensitive data.

A method, apparatus, non-transitory computer readable medium, and system for a privacy sensitive computing system are described. One or more embodiments of the method, apparatus, non-transitory computer readable medium, and system include authorizing code for use with privacy sensitive data, receiving parameters for identifying the privacy sensitive data, identifying the privacy sensitive data from one or more databases based on the parameters, providing aggregate information about the privacy sensitive data to a user within a protected computing environment, verifying the code for use with the privacy sensitive data within the computing environment, and executing the code within the protected computing environment to process the privacy sensitive data based on the verification.

An apparatus, system, and method for a privacy sensitive computing system are described. One or more embodiments of the apparatus, system, and method include a code authorization unit configured to authorize code for use with privacy sensitive data, and to generate a hash of the code based on the authorization and a protected computing environment configured to verify the code based on the hash, and to execute the code with the privacy sensitive data based on the verification.

DETAILED DESCRIPTION

The present disclosure describes systems and methods for a privacy sensitive computing system. One or more embodiments provide a protected computing environment that uses a code authorization unit and a data aggregation unit to enable the use of privacy sensitive data for training a machine learning model. Before code is authorized for use in the protected computing environment, the code authorization unit verifies that the code does not violate privacy restrictions. A hash can be generated to assure that the code is not changed. The protected computing environment verifies the code based on the hash prior to allowing the code to interact with privacy sensitive data. The data aggregation unit aggregates the privacy sensitive data and allows limited access via the protected computing environment while enforcing privacy restrictions. For example, human users may be prevented from viewing data or access to the data can be limited in time.

Machine learning models often perform better when trained with large amounts of data. In some examples, this data can be generated by (or about) users. For example, machine learning models used to improve the user experience for software can benefit from being trained on data generated by monitoring how users interact with the software. However, in many cases, such user-generated data is subject to privacy restrictions or considerations. These considerations may prevent the data from being used in conventional machine learning training scenarios if, for example, the developers training the models are prevented from viewing the data.

One or more embodiments of the present disclosure provide a privacy sensitive computing system where user-generated assets are accessible (e.g., for training a machine learning model) but respect and enforce privacy considerations. For example, a privacy sensitive computing system code can verify that code does not log or display data before allowing the code to interact with the data. Thus, the system can enable the use of the data for training machine learning models without violating privacy restrictions.

By applying the unconventional step of reviewing how code interacts with data, and then generating a hash to ensure that only authorized code is executed within a protected computing environment, embodiments of the present disclosure enable the use of additional training data while providing enhanced protection against privacy violations.

A privacy sensitive computing environment according to the present disclosure authorizes aspects of the computing environment, the training scripts, and the users prior to allowing limited access to privacy sensitive data. In some examples, backend servers may use a dataset ID and prepare a list of pre-signed uniform resource locators (URLs) to send back to a training machine corresponding to the assets referenced by the dataset ID. The process ensures no pre-signed URLs correspond to assets that are requested to be deleted or are from users who opted out of the assets used for machine learning.

Additionally or alternatively, some embodiments of the present disclosure ensure that privacy sensitive data such as user generated assets aren't stored in a machine learning training pipeline beyond a predetermined time limit. For example, data may be removed after a regulation-mandated time, or upon user request. The data can be removed from a protected computing environment or a temporary database, or anywhere else that it has been stored within the training pipeline after the specified time limit (e.g., within a time limit of 30 days).

Embodiments of the present disclosure may be used in the context of training ML models while protecting the privacy of a user. An example of a privacy sensitive computing system context is provided with reference to FIGS. 1 and 2. Details regarding the architecture of an example privacy sensitive computing system are provided with references to FIGS. 3 and 4. Examples of privacy sensitive computing system operation are provided with reference to FIGS. 5 through 7.

Privacy Sensitive Computing System

Figure 1:
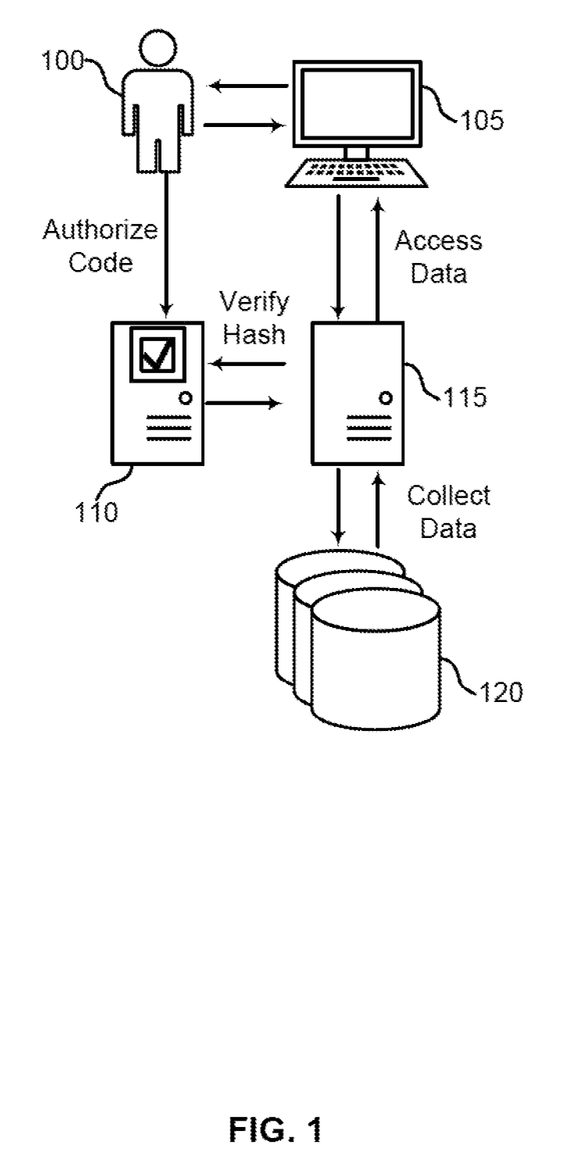
FIG. 1 shows an example of a privacy sensitive computing system according to aspects of the present disclosure.

FIG. 1 shows an example of a privacy sensitive computing system according to aspects of the present disclosure. The example shown includes user 100, protected computing environment 105, code authorization unit 110, data aggregation unit 115, and databases 120.

The user 100 accesses privacy sensitive data from the databases 120 via the protected computing environment 105 for training a machine learning. Prior to executing the code that trains the model, the code authorization unit 110 reviews the code to ensure that the code does not inappropriately interact with the data (i.e., by logging or displaying private details). Then, data aggregation unit 115 collects the data, verifies a hash of the code, and provides limited access to the data within the protected computing environment 105.

In an example embodiment, the code authorization unit 110 generates a hash of the code, so that the data aggregation unit 115 or the protected computing environment 105 can ensure that the code has not been changed or tampered with prior to execution. In some examples, the data aggregation unit 115 saves the code hash, decrypts the data, and checks if the data has been used more than once, or whether a time limit for using the data has expired.

According to the present disclosure, users 100 can create datasets by filtering a large pool of user-generated assets on certain criteria (i.e., file size). A dataset ID is then created and used in a subsequent process for deploying an instance of a protected computing environment 105 to run machine learning scripts that access the user-generated data referenced by the dataset ID. When the privacy sensitive computing system is deployed and a request is made to download the user-generated assets referenced by the dataset ID, the user 100, a protected computing environment, and training scripts are authenticated. The data aggregation unit 115 use the dataset ID and prepare a list of pre-signed uniform resource locators (URLs) to send back to the protected computing environment corresponding to the assets referenced by the dataset ID. In some examples, the present disclosure ensures no pre-signed URLs correspond to any assets that are requested to be deleted or any assets that are related to users who opted out of the data used for machine learning.

In some embodiments, the protected computing environment 105 is configured to train an artificial neural network. An artificial neural network is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, the node processes the signal and then transmits the processed signal to other connected nodes. In some cases, the signals between nodes comprise real numbers, and the output of each node is computed by a function of the sum of its inputs. Each node and edge is associated with one or more node weights that determine how the signal is processed and transmitted. During the training process, these weights are adjusted to improve the accuracy of the result (i.e., by minimizing a loss function which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

The protected computing environment 105 may be a physical or a virtual computing machine and is an example of, or includes aspects of, the corresponding element described with reference to FIG. 3.

According to some embodiments, code authorization unit 110 authorizes code for use with privacy sensitive data. In some examples, code authorization unit 110 generates a hash of the code based on the authorization. In some examples, the code includes a machine learning model, and the privacy sensitive data is used as input for the machine learning model. In some examples, code authorization unit 110 determines how the code will use the privacy sensitive data, where the authorization is based on the determination.

In some examples, code authorization unit 110 receives parameters for identifying the privacy sensitive data and authorize code for use with privacy sensitive data. In some examples, the code authorization unit 110 is configured to determine how the code interacts with privacy sensitive data. Code authorization unit 110 is an example of, or includes aspects of, the corresponding element described with reference to FIG. 3.

According to some embodiments, data aggregation unit 115 identifies and retrieves privacy sensitive data from one or more databases 120 based on parameters provided by a user 100. In some examples, data aggregation unit 115 provides aggregate information about the privacy sensitive data to a user 100 within the protected computing environment 105.

In some examples, data aggregation unit 115 identifies and collects data from multiple databases 120, where at least a portion of the privacy sensitive data is stored on each of the databases 120. In some examples, data aggregation unit 115 identifies a time limit for using the privacy sensitive data within the protected computing environment. In some examples, data aggregation unit 115 terminates access to the privacy sensitive data within the protected computing environment based on the time limit. In some examples, data aggregation unit 115 establishes and determines a time limit for a temporary database based on a privacy policy. In some examples, data aggregation unit 115 deletes the temporary database based on the time limit.

Thus, according to some embodiments, data aggregation unit 115 is configured to provide aggregate information about the privacy sensitive data while preventing a user 100 from accessing the privacy sensitive data. Data aggregation unit 115 is an example of, or includes aspects of, the corresponding element described with reference to FIGS. 3 and 4.

In some cases, the code authorization unit 110 and the data aggregation unit 115 are implemented on one or more servers. A server provides one or more functions to users linked by way of one or more of the various networks. In some cases, the server includes a single microprocessor board, which includes a microprocessor responsible for controlling all aspects of the server. In some cases, a server uses microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general purpose computing device, a personal computer, a laptop computer, a mainframe computer, a supercomputer, or any other suitable processing apparatus.

According to some embodiments, databases 120 store the privacy sensitive data. Databases 120 is an example of, or includes aspects of, the corresponding element described with reference to FIG. 3. Databases 120 may include one or more databases.

Figure 2:
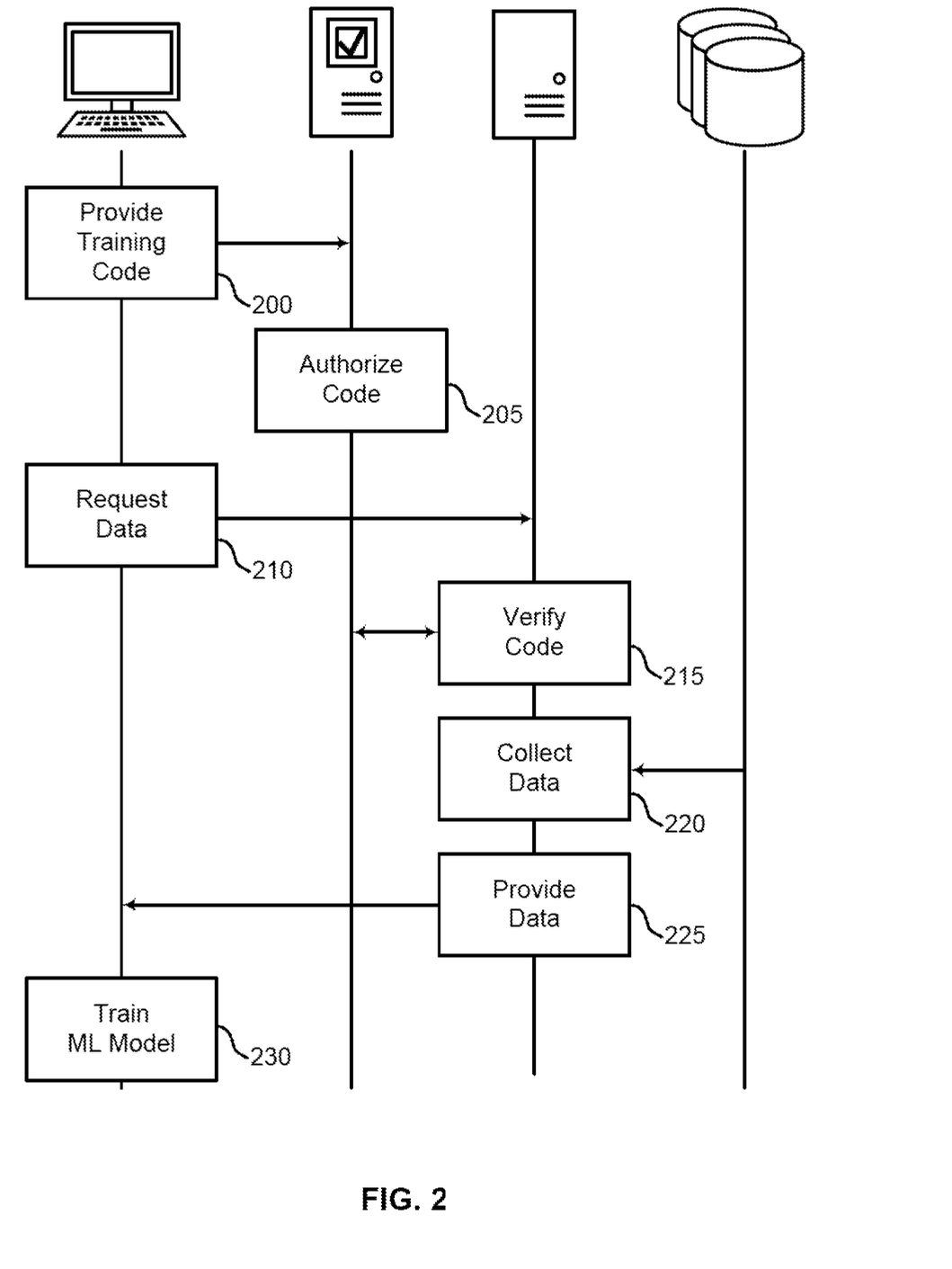
FIG. 2 shows an example of a privacy sensitive computing process according to aspects of the present disclosure.

FIG. 2 shows an example of a privacy sensitive computing process according to aspects of the present disclosure. The example provides a machine learning model to the privacy sensitive computing system and authorizes a code for the machine learning model. The databases provide asset IDs and owner IDs to the privacy sensitive computing system. Privacy sensitive data is collected and the machine learning model is trained, and the trained machine learning model is then provided to the user.

The present disclosure describes a process where users create a ML training script and obtain approval by a system administrator for use in a computing environment. ML users instantiate a training machine to run a script, which cannot be interacted with apart from viewing approved logs produced by the training machine. A custom authorization solution provides for the training machine to access user-generated data using an approved script. Some embodiments of the present disclosure describe a process whereby ML users create datasets from larger pools of assets by filtering on certain criteria, like asset size. Filtering of data may be performed automatically and may ensure compliance with, for example, General Data Protection Regulation (GDPR) data deletion requests.

At step 200, the user provides code for generating a machine learning model to the privacy sensitive computing system. In some examples, the machine learning model may comprise training scripts that require training data. Users often generate a large amount of data (e.g., when interacting with software products). ML models may be trained using user-generated assets, and the privacy sensitive computing system compliance with privacy and legal considerations for the data. In some cases, viewing and inspecting data is an integral part of ML model development. However, according to embodiments of the present disclosure, a user may interact with privacy sensitive data within a protected computing environment in a way that does not violate privacy restrictions.

At step 205, a code authorization unit authorizes the code. If the code is approved, the code hash is provided to the data aggregation unit. For example, when a user wishes to begin a cloud experiment provided by a user to IT instance using a pre-approved script, the code is submitted through a provided command line interface.

At step 210, the user requests access to data from one or more databases. The user may provide parameters such as the type and quantity of data desired. The request is routed to an internal compute instance that checks the code associated with the experiment. When a training script executes, the dataset ID and the digital signature are passed to the cloud experiment as inputs. When user-generated assets are requested within the cloud experiment, a call is made to a backend ethos service. The dataset ID and digital signature authorize the request for user-generated assets associated with the dataset ID. The backend ethos service prepares a list of pre-signed URLs, each corresponding to an asset. The pre-signed URLs are passed to the cloud experiment, where assets are downloaded and used in the ML training script.

At step 215, the data aggregation unit verifies the code based on a hash received from the code authorization unit. In some examples, the authentication comprises the identity of the user, computing environment, and the code which runs machine learning on the assets. In one example, a server computes the hash of the code, and verifies the hash is among the list of pre-approved hashes added by system administrators. After verification, a dataset ID is digitally signed within an IT instance using a secure asymmetric encryption algorithm, and a request is created for a cloud experiment on behalf of the user, attaching the digital signature and the input dataset ID. The IT instance submits a signed cloud experiment on behalf of a user.

At step 220, the privacy sensitive computing system identifies and collects privacy sensitive data from one or more databases based on the parameters. In some examples, a dataset ID is created that selects the user-generated assets on which the ML training script is to operate. The user interacts with a user interface, where the required number of assets and filters on key attributes (for example, file size) are chosen. When a user is satisfied with the parameters for a dataset, a dataset ID is saved. The asset ID references comprise the dataset ID and are stored in a backend. Assets are not downloaded directly from the stored location in a secure bucket. The dataset ID refers to a list of asset ID references.

The technical implementation of the web user interface is supported by a backend service behind an input output gateway, which communicates with database servers hosted on cloud computing platforms. ML users launch a cloud experiment while referencing the dataset ID on which the script is to operate on. A cloud experiment is a feature developed as part of a training framework where users deploy training machines that cannot be interacted with to run the training scripts. Therefore, the technical implementation is a modified cloud experiment where access mechanisms and privacy controls provide for ML training on unviewable user-generated assets. When launching a cloud experiment, the user inputs the dataset ID as an argument into the provided command line interface used to deploy cloud experiments. During the cloud experiment script execution, a code library is provided that handles authorization with a backend.

After authorization, the backend uses the dataset ID to retrieve a list of pre-signed URLs corresponding to the assets in the dataset ID. Assets that are a part of the dataset ID may be unavailable due to a ML opt-out request or because a GDPR request mandated the deletion of the asset. Therefore, mechanisms are in place to ensure the assets are not made available at the time the cloud experiment training script is executed.

An instance of a backend service relates to how requests for user-generated assets are authorized within cloud experiments. Requests for user-generated assets are authorized if made in the authenticated computing environment and coming as part of an authenticated script. The full authorization flow begins when a model is trained by user-generated assets as part of an ML training script reviewed by an administrator. The administrator checks if coding guidelines are respected and user-generated assets are accessed using the approved code pattern. If a code is approved, the administrator creates a hash of the code, and adds the hash to a database table through a call (i.e., a web service using transfer architecture to handle a request; for example representational state transfer application programming interface to a backend service.

Assets are not used to train machine learning scripts if privacy restrictions prevent training when the script is initiated. Though the assets cannot be seen, users can create datasets out of subsets of user-generated assets by filtering on key attributes. In some embodiments, users may not interact with the training scripts after deployment by the platform, and if there is a mechanism that proves the possibility of a job working with an asset becoming subject to a GDPR request, the job is terminated.

At step 225, the data aggregation unit provides the data for use within the protected computing environment. At step 230, the user trains the machine learning model with the approved code within the protected computing environment. In some examples, an approved code pattern ensures that secrets used as part of authentication are not visible to the user, and if the expiry of a dataset elapses while the script is executing, the job terminates while deleting assets. After training, the privacy sensitive computing system provides the trained machine learning model back to the user. When the training script is complete, assets are deleted, and the training machine may be permanently terminated.

In some examples, a mechanism is used so that an asset can be permanently deleted from the databases upon a user's request. The ML models work with user-generated assets in computing environments where an administrator can ensure timely deletion. In some examples, the privacy sensitive computing system ensures that aspects of the data available within a protected computing environment are not sufficient to authenticate an identity a user.

System Architecture

Figure 3:
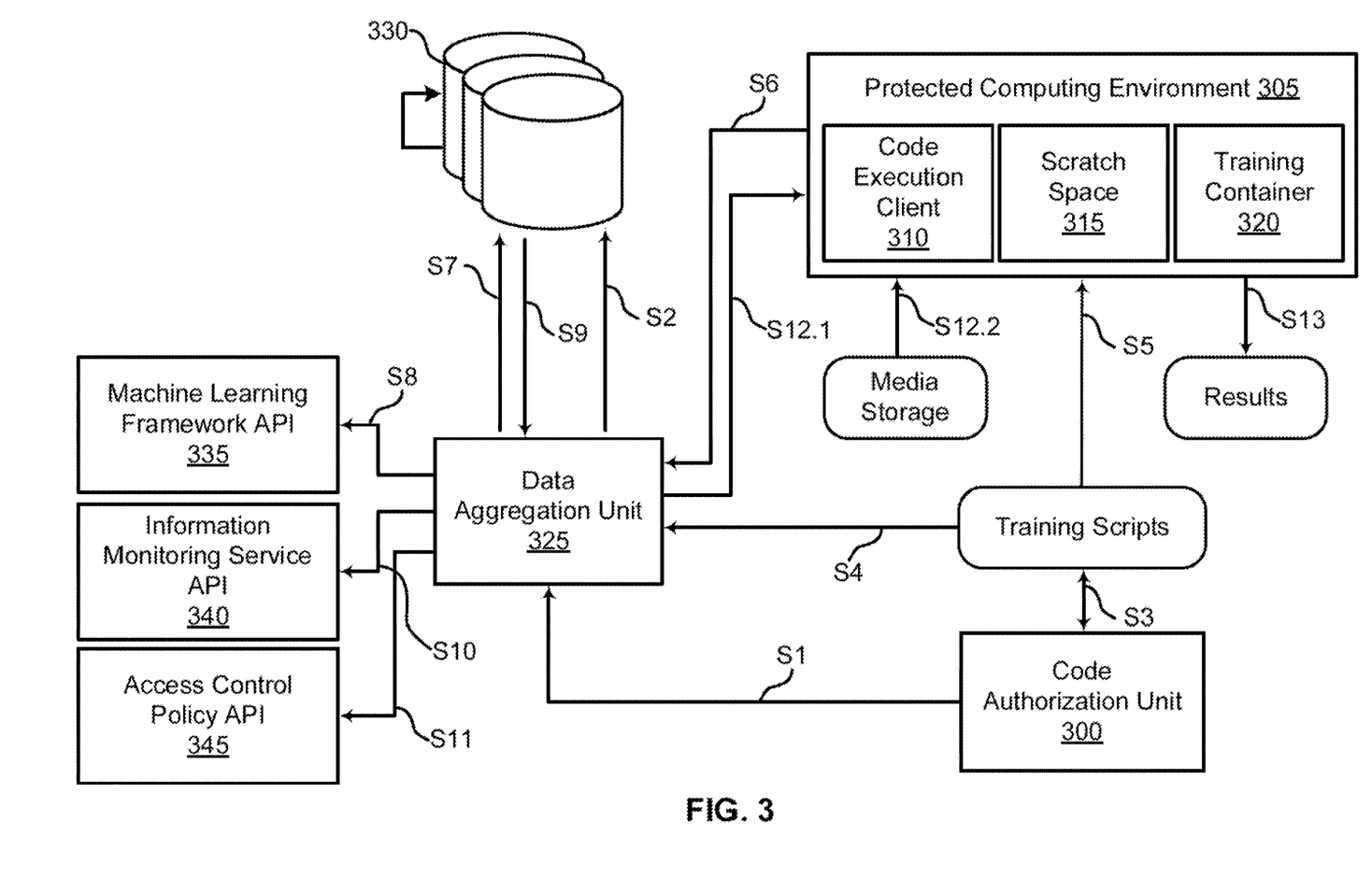
FIG. 3 shows an example of a privacy sensitive computing architecture according to aspects of the present disclosure.
Figure 4:
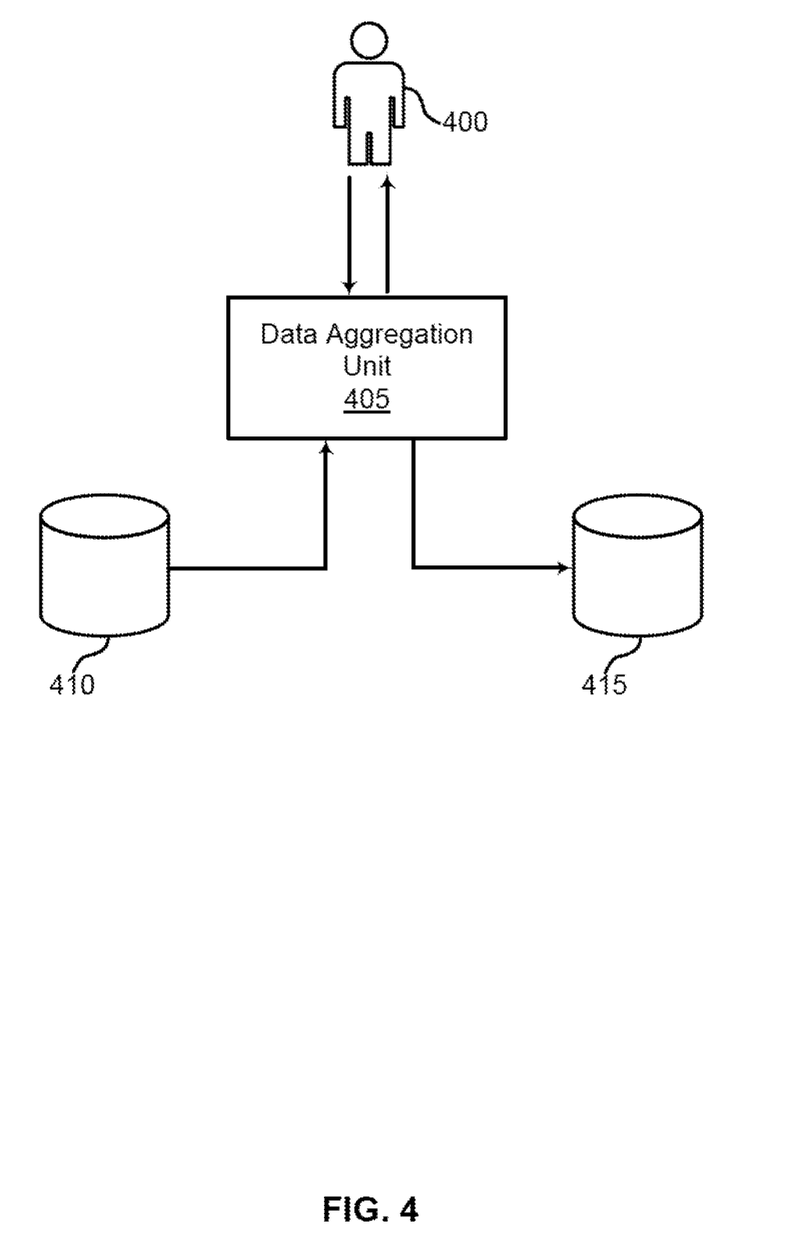
FIG. 4 shows an example of a database retrieval system according to aspects of the present disclosure.

In FIGS. 3 and 4, a privacy sensitive computing system and a method of providing the same are described. One or more embodiments of the apparatus, system, and method include a code authorization unit configured to authorize code for use with privacy sensitive data, and to generate a hash of the code based on the authorization and a protected computing environment configured to verify the code based on the hash, and to execute the code with the privacy sensitive data based on the verification.

In some examples, the code authorization unit is configured to determine how the code interacts with privacy sensitive data. Some examples of the apparatus, system, and method described above further include a plurality of databases storing the privacy sensitive data. Some examples of the apparatus, system, and method described above further include a temporary database storing references to the privacy sensitive data from the plurality of databases.

Some examples of the apparatus, system, and method described above further include a data aggregation unit configured to provide aggregate information about the privacy sensitive data while preventing a user from accessing the privacy sensitive data. Some examples of the apparatus, system, and method described above further include a privacy component configured to establish limits on access to the privacy sensitive data within the protected computing environment.

FIG. 3 shows an example of a privacy sensitive computing architecture according to aspects of the present disclosure. The example shown includes code authorization unit 300, protected computing environment 305, data aggregation unit 325, databases 330, machine learning framework API 335, information monitoring service API 340, and access control policy API 345.

Code authorization unit 300, protected computing environment 305, and databases 330 are examples of, or includes aspects of, the corresponding elements described with reference to FIG. 1. Data aggregation unit 325 is an example of, or includes aspects of, the corresponding element described with reference to FIGS. 1 and 4.

In one embodiment, protected computing environment 305 includes code execution client 310, scratch space 315, and training container 320. The code execution client 310 writes assets to the scratch space 315 and periodically checks for an expiration of a dataset and deletes the dataset if the dataset is expired. The training container 320 contains model files and write the results to storage, where the storage contains results which include code, model parameters, and/or model predictions At step S1, the code authorization unit 300 submits a training script for review. Then, a code hash is sent to the data aggregation unit 325.

At step S2, the data aggregation unit 325 saves the code hash.

At step S3, a training script, dependencies, dataset ID, and URL are submitted to the file library.

At step S4, the code and/or hash are sent to the data aggregation unit 325 for verification.

At step S5, the file library sends an encrypted secret is sent to the protected computing environment 305.

At step S6, protected computing environment 305 provides the encrypted secret, the dataset ID, and a run ID to the data aggregation unit 325. The run ID is an ID that is associated with running the code.

At step S7, the data aggregation unit 325 decrypts the secret and checks if the secrets are used more than once.

At step S8, the run ID is validated and is sent to the machine learning framework API 335.

At step S9, the databases 330 send asset IDs and owner IDs to the data aggregation unit 325.

At step S10, the information monitoring service API 340 checks if the owner has consent to access the ML data.

At step S11, the access control policy API 345 receives a pre-signed URL based on the asset ID, if the asset still exists.

At step S12.1, the data aggregation unit 325 returns the pre-signed and a token to the protected computing environment 305.

At step S12.2, the protected computing environment 305 may receive media from the media storage. The media storage is not privacy sensitive.

At step S13, the protected computing environment 305 may send results to storage. The results may include code, model parameters, and/or model predictions.

FIG. 4 shows an example of a database retrieval system according to aspects of the present disclosure. The example shown includes user 400, data aggregation unit 405, database 410, and temporary database 415. Data aggregation unit 405 is an example of, or includes aspects of, the corresponding element described with reference to FIGS. 1 and 3.

According to some embodiments, temporary database 415 stores references to the privacy sensitive data in one or more databases 410 for use within the protected computing environment. In some cases, the same temporary database 415 may be used to train multiple machine learning models. The database may have a time limit based on time restrictions placed on the stored data.

System Operation

Figure 5:
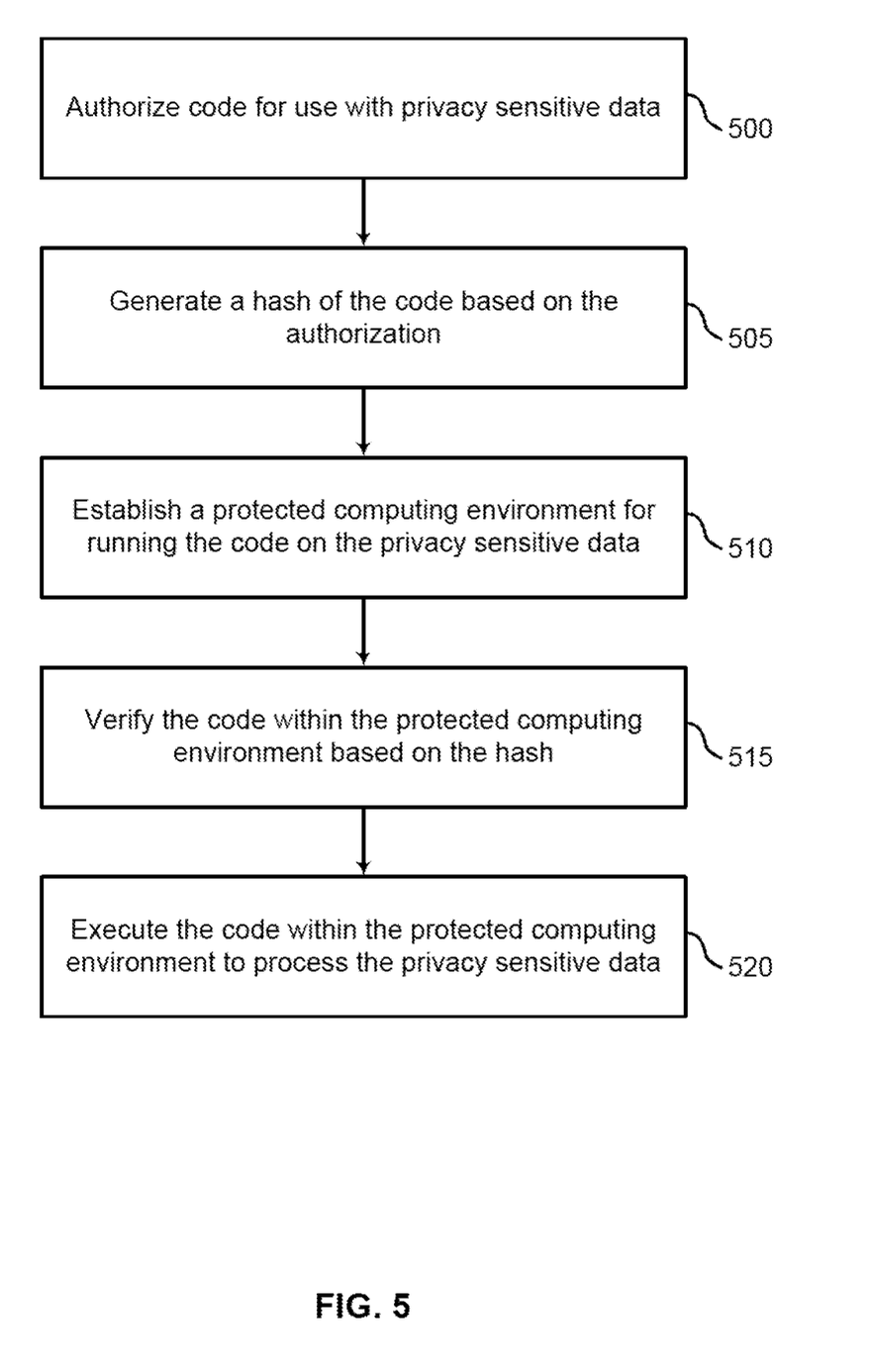
FIGS. 5 through 6 show examples of a process for executing a code according to aspects of the present disclosure.
Figure 6:
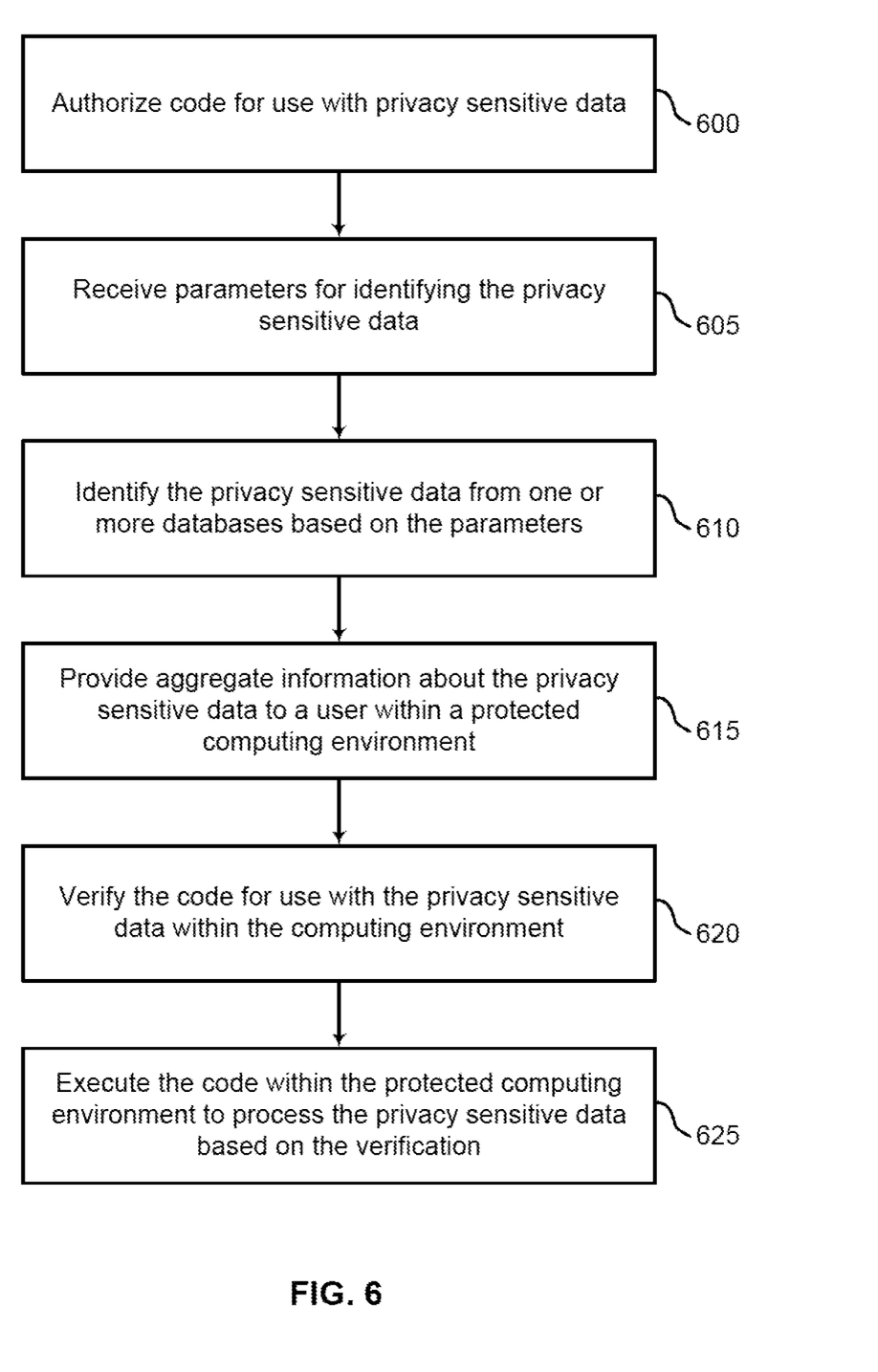

In FIGS. 5 and 6, a method, apparatus, non-transitory computer readable medium, and system for a privacy sensitive computing system are described. One or more embodiments of the method, apparatus, non-transitory computer readable medium, and system include authorizing code for use with privacy sensitive data, generating a hash of the code based on the authorization, establishing a protected computing environment for running the code on the privacy sensitive data, verifying the code within the protected computing environment based on the hash, and executing the code within the protected computing environment to process the privacy sensitive data.

In some examples, the code comprises a machine learning model, and the privacy sensitive data is used as input for the machine learning model. Some examples of the method, apparatus, non-transitory computer readable medium, and system described above further include determining how the code will use the privacy sensitive data, wherein the authorization is based on the determination.

Some examples of the method, apparatus, non-transitory computer readable medium, and system described above further include generating rules for accessing the privacy sensitive data on the protected computing environment based on a privacy policy. Some examples further include providing limited access to the privacy sensitive data via the protected computing environment based on the rules.

Some examples of the method, apparatus, non-transitory computer readable medium, and system described above further include verifying a user is authorized to access the privacy sensitive data using the protected computing environment, wherein the code is executed based on verifying the user.

Another method, apparatus, non-transitory computer readable medium, and system are also described. One or more embodiments of the method, apparatus, non-transitory computer readable medium, and system include authorizing code for use with privacy sensitive data, receiving parameters for identifying the privacy sensitive data, identifying the privacy sensitive data from one or more databases based on the parameters, providing aggregate information about the privacy sensitive data to a user within a protected computing environment, verifying the code for use with the privacy sensitive data within the computing environment, and executing the code within the protected computing environment to process the privacy sensitive data based on the verification.

Some examples of the method, apparatus, non-transitory computer readable medium, and system described above further include identifying privacy rules regarding aspects of the data that can be viewed by the user, wherein the aggregate information is provided based on the privacy rules.

Some examples of the method, apparatus, non-transitory computer readable medium, and system described above further include identifying a plurality of databases, wherein at least a portion of the privacy sensitive data is stored on each of the databases. Some examples further include determining privacy rules for the protected computing environment based on rules for each of the plurality of databases.

Some examples of the method, apparatus, non-transitory computer readable medium, and system described above further include identifying a time limit for using the privacy sensitive data within the protected computing environment. Some examples further include terminating access to the privacy sensitive data within the protected computing environment based on the time limit.

Some examples of the method, apparatus, non-transitory computer readable medium, and system described above further include retrieving the privacy sensitive data from a plurality of databases based on the parameters. Some examples further include storing references to the privacy sensitive data in a temporary database for use within the protected computing environment.

Some examples of the method, apparatus, non-transitory computer readable medium, and system described above further include determining a time limit for the temporary database based on a privacy policy. Some examples further include deleting the temporary database based on the time limit. Some examples of the method, apparatus, non-transitory computer readable medium, and system described above further include preventing the user from seeing the privacy sensitive data.

Some examples of the method, apparatus, non-transitory computer readable medium, and system described above further include receiving a first portion of the privacy sensitive data for processing within the protected computing environment. Some examples further include processing the first portion of the privacy sensitive data using the code. Some examples further include removing the first portion of the privacy sensitive data from the protected computing environment. Some examples further include receiving a second portion of the privacy sensitive data for processing within the protected computing environment after removing the first portion of the privacy sensitive data.

Some examples of the method, apparatus, non-transitory computer readable medium, and system described above further include identifying a limited amount of the privacy sensitive data for processing within the protected computing environment. Some examples further include identifying the first portion of the privacy sensitive data and the second portion of the privacy sensitive data based on the limited amount.

FIG. 5 shows an example of a process for executing a code according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 500, the system authorizes code for use with privacy sensitive data. The authorization is based on determining how the code will use the privacy sensitive data. In some cases, the operations of this step refer to, or may be performed by, a code authorization unit as described with reference to FIGS. 1 and 3.

At operation 505, the system generates a hash of the code based on the authorization. The hash takes a piece of text, with an indefinite length. In a deterministic and repeatable way, the hash creates a smaller unique ID with some fixed length. For example, the hash for code may be a string such as 'abd37534c'. In some cases, the operations of this step refer to, or may be performed by, a code authorization unit as described with reference to FIGS. 1 and 3.

In one example, the hash function is the SHA224 hash function, which belongs to the SHA-2 family. The hash function may take text with indefinite length as input, and, in a deterministic and repeatable way, create a much smaller, unique ID with some fixed length.

At operation 510, the system establishes a protected computing environment for running the code on the privacy sensitive data. In some examples, a user (i.e., a developer) may not interact with the protected computing environment after the system begins the process of training an ML model. Unlike a conventional computing environment, where a user may start a script, and may terminate that script at any point as the script is progressing. In some cases, the operations of this step refer to, or may be performed by, a protected computing environment as described with reference to FIG. 3.

In some cases, the protected computing environment provides a guarantee that the assets are deleted once the script is complete. As a result, there is no way for the user to forget to delete assets after the training is complete. Instead, the deletion of these assets is performed by the system running the script.

At operation 515, the system verifies the code within the protected computing environment based on the hash. The verified code is then sent to the data aggregation unit. In some cases, the operations of this step refer to, or may be performed by, a protected computing environment as described with reference to FIG. 3.

At operation 520, the system executes the code within the protected computing environment to process the privacy sensitive data. In some cases, the operations of this step refer to, or may be performed by, a protected computing environment as described with reference to FIG. 3.

FIG. 6 shows an example of a process for executing a code according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 600, the system authorizes code for use with privacy sensitive data. In some cases, the operations of this step refer to, or may be performed by, a code authorization unit as described with reference to FIGS. 1 and 3.

At operation 605, the system receives parameters for identifying the privacy sensitive data. In some cases, the operations of this step refer to, or may be performed by, a code authorization unit as described with reference to FIGS. 1 and 3.

At operation 610, the system identifies the privacy sensitive data from one or more databases based on the parameters. The system may also identify privacy rules or a time limit for the privacy sensitive data. The privacy rules may include aspects of the data that can be viewed by the user. The time limit may include a limit for using the privacy sensitive data within the protected computing environment. In some cases, the operations of this step refer to, or may be performed by, a data aggregation unit as described with reference to FIGS. 1, 3, and 4.

At operation 615, the system provides aggregate information about the privacy sensitive data to a user within a protected computing environment. The aggregate information is provided based on the privacy rules. In some cases, the operations of this step refer to, or may be performed by, a data aggregation unit as described with reference to FIGS. 1, 3, and 4.

At operation 620, the system verifies the code for use with the privacy sensitive data within the computing environment. In some cases, the operations of this step refer to, or may be performed by, a protected computing environment as described with reference to FIG. 3.

At operation 625, the system executes the code within the protected computing environment to process the privacy sensitive data based on the verification. In some cases, the operations of this step refer to, or may be performed by, a protected computing environment as described with reference to FIG. 3.

Figure 7:
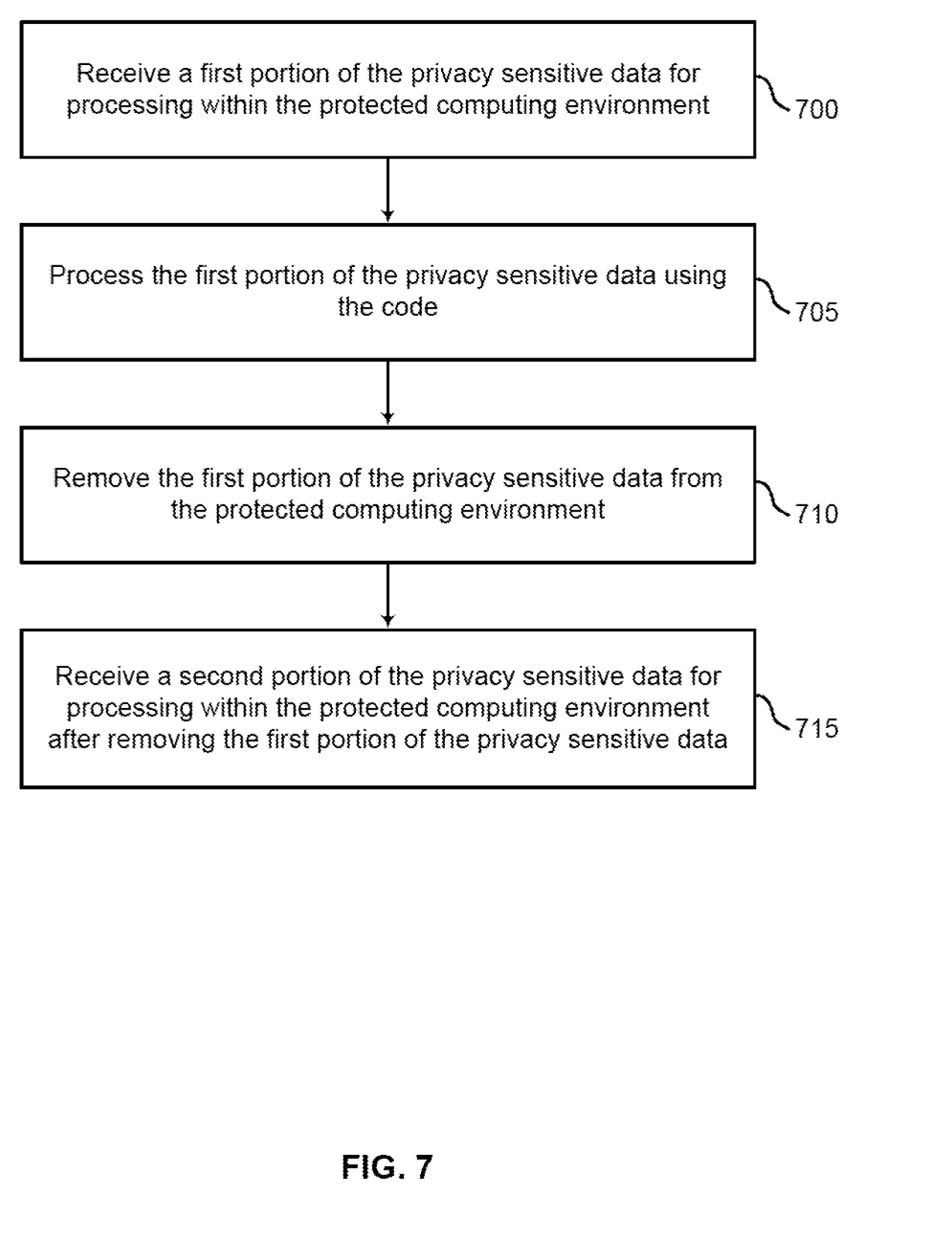
FIG. 7 shows an example of a process for receiving privacy sensitive data according to aspects of the present disclosure.

FIG. 7 shows an example of a process for receiving privacy sensitive data according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 700, the system receives a first portion of the privacy sensitive data for processing within the protected computing environment. In some cases, the operations of this step refer to, or may be performed by, a protected computing environment as described with reference to FIG. 3.

At operation 705, the system processes the first portion of the privacy sensitive data using the code. In some cases, the operations of this step refer to, or may be performed by, a protected computing environment as described with reference to FIG. 3.

At operation 710, the system removes the first portion of the privacy sensitive data from the protected computing environment. In some cases, the operations of this step refer to, or may be performed by, a protected computing environment as described with reference to FIG. 3.

At operation 715, the system receives a second portion of the privacy sensitive data for processing within the protected computing environment after removing the first portion of the privacy sensitive data. In some cases, the operations of this step refer to, or may be performed by, a protected computing environment as described with reference to FIG. 3.

The description and drawings described herein represent example configurations and do not represent all the implementations within the scope of the claims. For example, the operations and steps may be rearranged, combined, or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described systems and methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates the transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method comprising:
   obtaining privacy sensitive data;
   identifying a privacy restriction of the privacy sensitive data;
   authorizing code for use with the privacy sensitive data by reviewing the code before the code is authorized to determine whether the code logs or displays with the privacy sensitive data in violation of the privacy restriction, wherein the code comprises executable code for processing the privacy sensitive data;
   receiving parameters for identifying the privacy sensitive data;
   identifying the privacy sensitive data from one or more databases based on the parameters;
   retrieving the privacy sensitive data from the one or more databases based on the parameters;
   storing references to the privacy sensitive data in a temporary database for use within a protected computing environment;
   providing aggregate information about the privacy sensitive data to a user within the protected computing environment;
   verifying, by the protected computing environment, that the authorized code for use with the privacy sensitive data does not violate the privacy restriction and is authorized for execution within the protected computing environment;
   executing the authorized code within the protected computing environment to process the privacy sensitive data based on the verification without violating the privacy restriction;
   determining a time limit for the temporary database based on a privacy policy; and
   deleting the temporary database based on the time limit.

2. The method of claim 1, further comprising:
   identifying privacy rules regarding aspects of the privacy sensitive data that can be viewed by the user, wherein the aggregate information is provided based on the privacy rules.

3. The method of claim 1, further comprising:
   identifying a plurality of databases, wherein at least a portion of the privacy sensitive data is stored on each of the plurality of databases; and
   determining privacy rules for the protected computing environment based on rules for each of the plurality of databases.

4. The method of claim 1, further comprising:
   identifying a time limit for using the privacy sensitive data within the protected computing environment; and
   terminating access to the privacy sensitive data within the protected computing environment based on the time limit.

5. The method of claim 1, further comprising:
preventing the user from seeing the privacy sensitive data.

6. The method of claim 1, further comprising:
receiving a first portion of the privacy sensitive data for processing within the protected computing environment;
processing the first portion of the privacy sensitive data using the code;
removing the first portion of the privacy sensitive data from the protected computing environment; and
receiving a second portion of the privacy sensitive data for processing within the protected computing environment after removing the first portion of the privacy sensitive data.

7. The method of claim 6, further comprising:
identifying a limited amount of the privacy sensitive data for processing within the protected computing environment; and
identifying the first portion of the privacy sensitive data and the second portion of the privacy sensitive data based on the limited amount.

8. A non-transitory computer readable medium storing code for implementing a protected computing environment, the code comprising instructions executable by at least one processor to:
obtain privacy sensitive data;
identify a privacy restriction of the privacy sensitive data;
authorize code for use with the privacy sensitive data by reviewing the code before the code is authorized to determine whether the code logs or displays with the privacy sensitive data in violation of the privacy restriction, wherein the code comprises executable code for processing the privacy sensitive data;
receive parameters for identifying the privacy sensitive data;
identify the privacy sensitive data from one or more databases based on the parameters;
retrieve the privacy sensitive data from the one or more databases based on the parameters;
store references to the privacy sensitive data in a temporary database for use within the protected computing environment;
provide aggregate information about the privacy sensitive data to a user within a protected computing environment;
verify, by the protected computing environment, that the authorized code for use with the privacy sensitive data does not violate the privacy restriction and is authorized for execution within the protected computing environment;
execute the authorized code within the protected computing environment to process the privacy sensitive data based on the verification without violating the privacy restriction;
determine a time limit for the temporary database based on a privacy policy; and
delete the temporary database based on the time limit.

9. An apparatus comprising at least one processor and at least one non-transitory memory including instructions executable by the at least one processor to:
obtain privacy sensitive data;
identify a privacy restriction of the privacy sensitive data;
authorize code for use with the privacy sensitive data by reviewing the code before the code is authorized to determine whether the code logs or displays with the privacy sensitive data in violation of the privacy restriction, wherein the code comprises executable code for processing the privacy sensitive data;
receive parameters for identifying the privacy sensitive data;
identify the privacy sensitive data from one or more databases based on the parameters;
retrieve the privacy sensitive data from the one or more databases based on the parameters;
store references to the privacy sensitive data in a temporary database for use within a protected computing environment;
provide aggregate information about the privacy sensitive data to a user within the protected computing environment;
verify, by the protected computing environment, that the authorized code for use with the privacy sensitive data does not violate the privacy restriction and is authorized for execution within the protected computing environment;
execute the authorized code within the protected computing environment to process the privacy sensitive data based on the verification without violating the privacy restriction;
determine a time limit for the temporary database based on a privacy policy; and
delete the temporary database based on the time limit.

* * * * *